US012100921B2

(12) United States Patent
Kohler

(10) Patent No.: US 12,100,921 B2
(45) Date of Patent: Sep. 24, 2024

(54) ELECTRICAL MODULE FOR CONNECTING TO A MOUNTING RAIL AND CONTACTING ELEMENT FOR SAME

(71) Applicant: ZUMTOBEL LIGHTING GMBH, Dornbirn (AT)

(72) Inventor: Christian Kohler, Dornbirn (AT)

(73) Assignee: Zumtobel Lighting GmbH, Dornbirn (AT)

( * ) Notice: Subject to any disclaimer, the term of this patent is extended or adjusted under 35 U.S.C. 154(b) by 0 days.

(21) Appl. No.: 18/686,551

(22) PCT Filed: Dec. 5, 2022

(86) PCT No.: PCT/EP2022/084408
§ 371 (c)(1),
(2) Date: Feb. 26, 2024

(87) PCT Pub. No.: WO2023/117392
PCT Pub. Date: Jun. 29, 2023

(65) Prior Publication Data

US 2024/0266792 A1 Aug. 8, 2024

(30) Foreign Application Priority Data

Dec. 22, 2021 (DE) ..................... 10 2021 134 189.2

(51) Int. Cl.
*H01R 25/14* (2006.01)
*F21V 21/35* (2006.01)
(Continued)

(52) U.S. Cl.
CPC ........... *H01R 25/142* (2013.01); *F21V 21/35* (2013.01); *F21V 23/06* (2013.01); *H01R 13/639* (2013.01)

(58) Field of Classification Search
CPC ...................................................... F21V 21/35
See application file for complete search history.

(56) References Cited

U.S. PATENT DOCUMENTS 4,010,997 A * 3/1977 Bulanchuk ........... H01R 25/142 439/333
10,135,209 B1 11/2018 Wynnik
2015/0236462 A1* 8/2015 Davidson, Jr. ....... H01R 25/142 439/122

FOREIGN PATENT DOCUMENTS

WO 200191250 A1 11/2001
WO 2021069296 A1 4/2021

OTHER PUBLICATIONS

PCT/EP2022/084408, International Search Report and Writen Opinion, Mar. 7, 2023, 13 pages, and English Translation 6 pages.

(Continued)

*Primary Examiner* — Neil Abrams
(74) *Attorney, Agent, or Firm* — Andrus Intellectual Property Law, LLP

(57) ABSTRACT

The invention relates to an electrical module (50) for connecting to a mounting rail, comprising a contacting element (10) which is rotatably mounted about an axis of rotation (I) such that it can move between an open position in which an insertion and removal of the contacting element (10) from the mounting rail profile (60) is enabled, and a contacting position in which connection contacts contact lines of a bus bar, wherein the contacting element (10) has a main body (15) rotatably accommodated in a carrier element (30) of the electrical module (50) and a contact holder body (20) holding the connection contacts, which is arranged on the main body (15) and rotates with same, and wherein the contact holder body (20) is mounted such that it can be adjusted along the axis of rotation (I) relative to the main body (15) between a blocking position in which a rotation of the contacting element (10) is blocked, and a release position in which a rotation of the contacting element (10) is enabled.

9 Claims, 6 Drawing Sheets

(51) Int. Cl.
*F21V 23/06* (2006.01)
*H01R 13/639* (2006.01)

(56) References Cited

OTHER PUBLICATIONS

EP22818091.5, Decision to Grant dated Feb. 8, 2024, 5 pages.

* cited by examiner

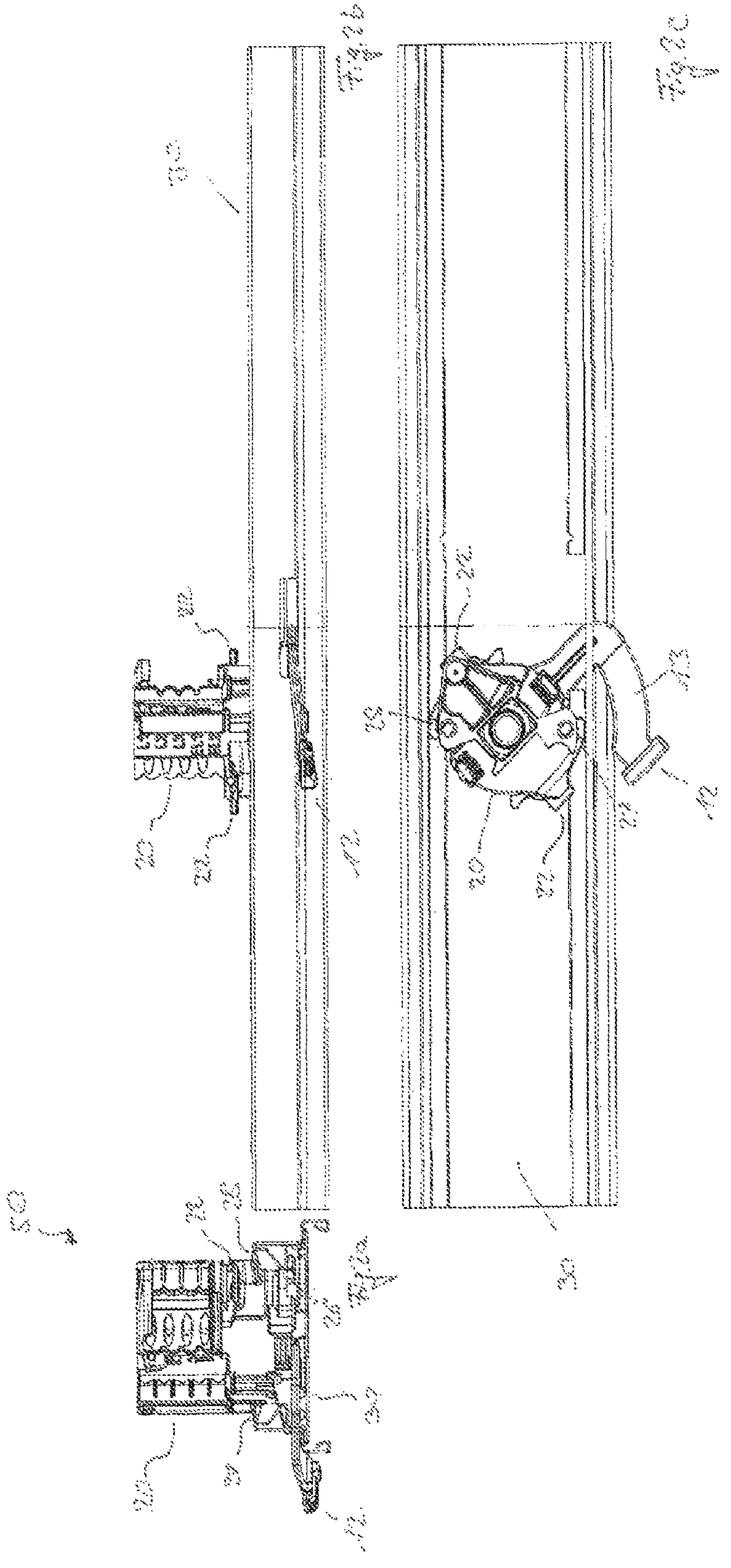

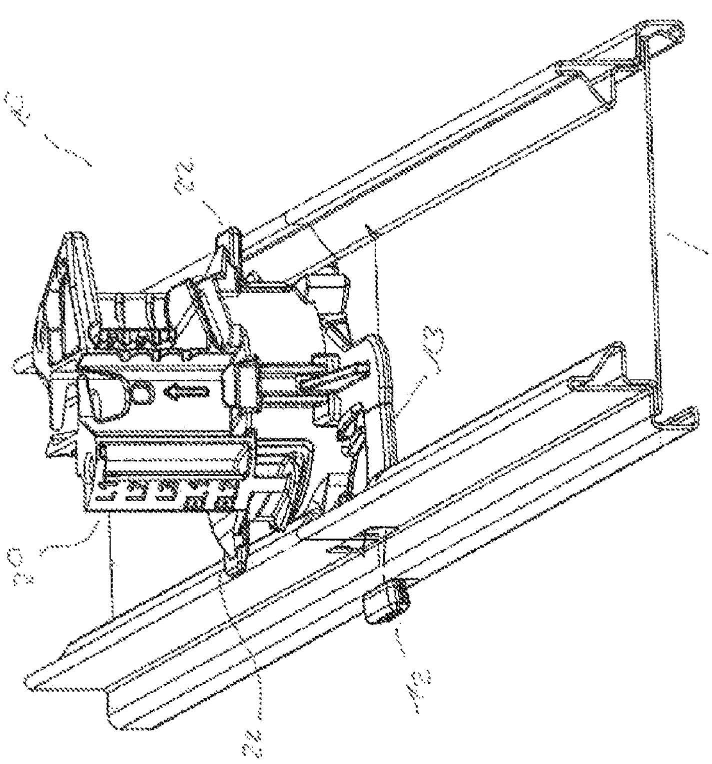
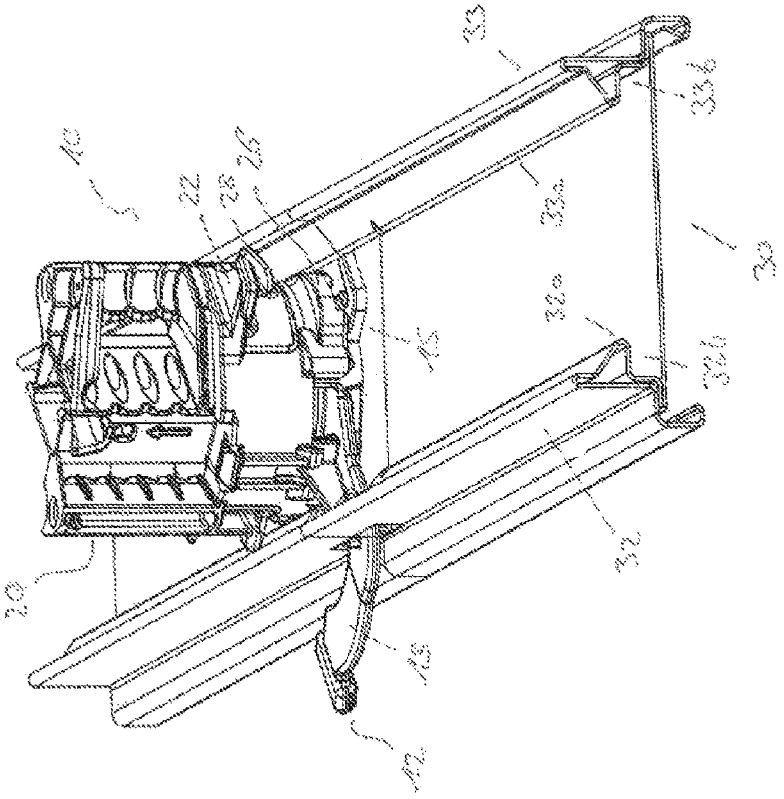

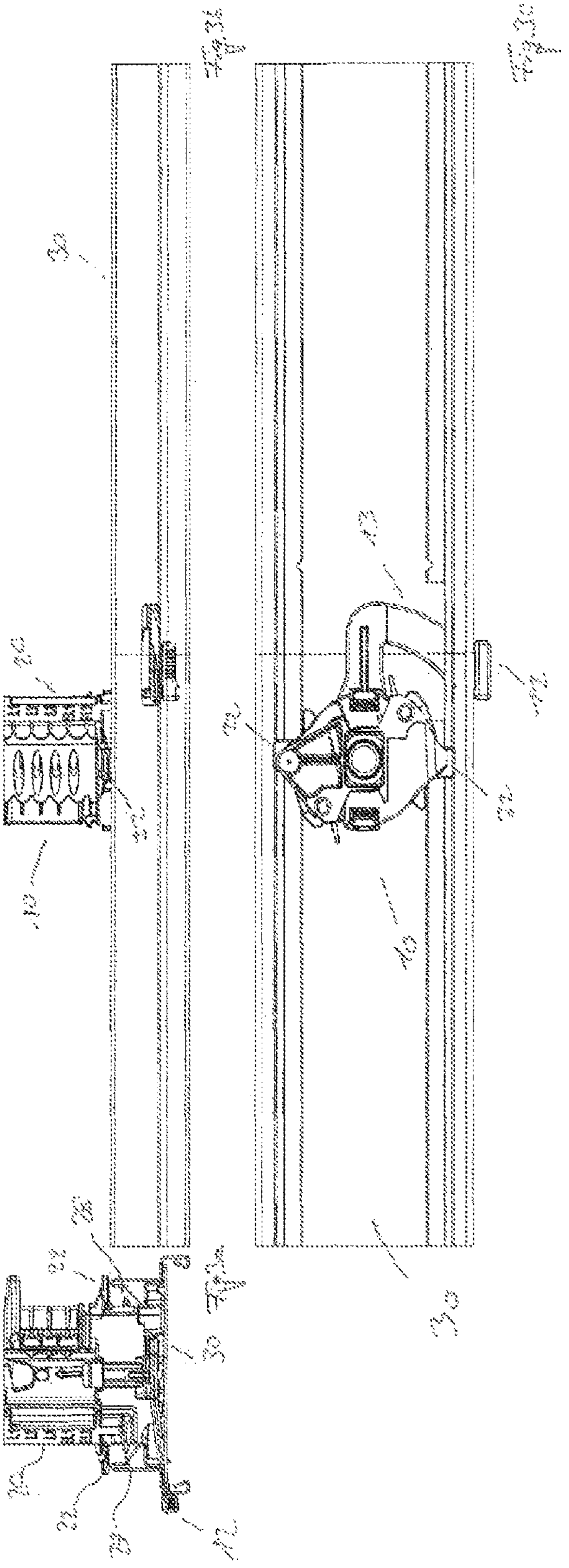

ELECTRICAL MODULE FOR CONNECTING TO A MOUNTING RAIL AND CONTACTING ELEMENT FOR SAME

CROSS-REFERENCE TO RELATED APPLICATION

The present application is the U.S. national stage application of international application PCT/EP2022/084408 filed Dec. 5, 2022, which international application was published on Jun. 29, 2023 as International Publication WO 2023/117392 A1. The international application claims priority to German Patent Application No. 10 2021 134 189.2, filed Dec. 22, 2021.

TECHNICAL FIELD OF THE INVENTION

The present invention relates to an electrical module, which can be designed, for example, as a luminaire and is to be coupled to a mounting rail, the mounting rail having a mounting rail profile with two side walls and at least one busbar arranged in the mounting rail profile with contactable lines. In the same way, the module can also be a camera or sensor unit or generally a unit which is provided for use in a strip lighting system.

BACKGROUND OF THE INVENTION

Mounting rails with a mounting rail profile and a busbar held in the mounting rail profile are known from the prior art, and are, for example, used for realizing elongate so-called strip lighting systems. A known strip lighting system is marketed by the applicant under the designation "TECTON," and is characterized in that luminaires or other electrical consumers can be flexibly positioned on the mounting rail over the entire length of the system. This is made possible in that, due to a special mounting of the conductors of the busbar(s), they are accessible to consumers over essentially the entire length of the strip lighting system, such that a contacting of the conductors can take place not only at fixed, predetermined positions but rather at any point. For example, WO 2001/091250 A1 discloses such a strip lighting system.

In the "TECTON" system mentioned above, two busbars are arranged opposite one another on the two side walls of a U-shaped mounting rail profile that is downwardly open. The contacting of the conductors of these two busbars takes place by the luminaire, or generally speaking the consumer to be connected, having a rotatable contacting element that is inserted into the mounting rail from the underside and then rotated by approximately 45°. Contacts arranged on the contacting element are designed in this case in such a way that they pivot outward laterally upon rotation, and finally contact the conductors of the busbars after rotation. In the case of a luminaire, a support element is furthermore coupled to the contacting element, on which support element, for example, the illuminants and possibly further electronic components are mounted.

Such contacting elements in the form of so-called rotary taps have often proven successful in practice and enable a simple mounting of an electrical module on a mounting rail. Numerous developments have been proposed in order to optimize the functionality of these contacting elements. For example, locking devices are known from the prior art which prevent unintentional rotation of the contacting element, which on the one hand facilitates the transport of the electrical module and, on the other hand, ensures that it cannot independently release from the mechanical anchoring on the mounting rail profile. Furthermore, it is known to provide different sealing measures in order to ensure that the handles or levers required for actuating the contacting element do not impair the sealing of the strip lighting system that is ultimately realized. Finally, it is known to design the rotary taps and the mounting rail profile in such a way that the contacting element can only be arranged in the mounting rail in a correct orientation.

A further problem that has not yet been addressed is the requirement to ensure that only the lines provided for this purpose can actually be contacted via the connection contacts of the contacting element. Because in the prior art the lines of the busbar are arranged one above the other at a relatively small distance, there is the risk that the contacting element is rotated too early when the electrical module is attached to the mounting rail, and in this case individual contacts unintentionally contact the incorrect lines of the busbar(s). This can possibly lead to an undesired short-circuit or to other damage to the electrical module and/or even to the entire system.

SUMMARY OF THE INVENTION

The present invention is therefore based on the object of providing an improvement in that it is ensured that only the desired lines of a busbar can actually be contacted by such a contacting element.

This object is achieved by an electrical module for connecting to a mounting rail which has the features of claim 1. Furthermore, the object is achieved by a contacting element for an electrical module according to claim 11. Advantageous developments of the invention are the subject-matter of the dependent claims.

The electrical module according to the invention has a contacting element which is initially constructed in an analogous manner as the contacting elements known from the above prior art. In the present case, too, the contacting element is thus rotatably mounted relative to a support element of the electrical module between an open position, in which an insertion and removal of the contacting element from the mounting rail profile is enabled, and a contacting position, in which the connection contacts contact lines of the busbar. In order now to ensure that incorrect lines are not inadvertently contacted when an electrical module is mounted on a mounting rail, it is provided that a contact holder body holding the connection contacts is mounted so as to be adjustable relative to a main body of the contacting element along the axis of rotation about which the contacting element can be rotated. The contact holder body can thereby move between a blocking position in which a rotation of the contacting element is blocked, and a release position in which a rotation of the contacting element is enabled.

Because, according to the present invention, the contact holder body is movably mounted, it is ensured that only the lines of the busbar(s) actually provided for contacting are actually contacted when the electrical module is connected to the mounting rail. As long as the electrical module is not located in the position completely attached to the mounting rail, the contact holder body remains in the blocking position, so that unintentional rotation of the contacting element and thus unintentional contacting of incorrect lines of the busbar(s) is prevented. Only if the electrical module is completely attached to the mounting rail does the contact holder body according to the present invention reach the release position, in which a rotation of the contacting element and thus an actual pivoting out of the contacts is now enabled. An unintentional touching of the lines at an incorrect height of the busbar(s) is thus ruled out by this safety mechanism.

According to the present invention, an electrical module for connection to a mounting rail is thus proposed, the mounting rail comprising a mounting rail profile with two side walls and at least one busbar, which busbar is arranged on one of the two inner sides of the side walls of the mounting rail profile and provides electrically contactable lines, the electrical module comprising a contacting element, which can be inserted into the mounting rail profile and comprises connection contacts, which are provided for bearing against lines of the busbar in a state in which the contacting element is inserted into the mounting rail profile, the contacting element being mounted so as to be rotatable about an axis of rotation relative to a support element of the electrical module between an open position, in which an insertion and removal of the contacting element from the mounting rail profile is enabled, and a contacting position, in which the connection contacts contact lines of the busbar, and the contacting element comprising a main body, which is rotatably accommodated in the support element of the electrical module, and a contact holder body, which holds the connection contacts and is arranged on the main body and rotates therewith, and the contact holder body being mounted according to the invention so as to be adjustable relative to the main body along the axis of rotation between a) a blocking position, in which a rotation of the contacting element is blocked, and b) a release position, in which a rotation of the contacting element is enabled.

Furthermore, a contacting element is proposed according to the invention for an electrical module for connecting to a mounting rail which has a mounting rail profile having two lateral walls and at least one busbar, which is arranged on one of the two inner sides of the lateral walls of the mounting rail profile and provides electrically contactable lines, the contacting element being insertable into the mounting rail profile and comprising connection contacts, which are provided for contacting lines of the busbar in a state in which the contacting element is inserted into the mounting rail profile, the contacting element being mounted so as to be rotatable about an axis of rotation relative to a support element of the electrical module between an open position, in which an insertion and removal of the contacting element from the mounting rail profile is enabled, and a contacting position, in which the connection contacts contact lines of the busbar, the contacting element comprising a main body, which is rotatably accommodated in the support element of the electrical module, and a contact holder body, which holds the connection contacts and is arranged on the main body and rotates therewith, and the contact holder body according to the invention being mounted so as to be adjustable relative to the main body along the axis of rotation between a) a blocking position, in which a rotation of the contacting element (10) is blocked, and b) a release position, in which a rotation of the contacting element (10) is enabled.

The contact holder body is preferably resiliently prestressed into the blocking position. This can be realized, for example, by using a coil or disk spring, which is supported on the one hand on the contact holder body and on the other hand on the main body and presses the two elements in opposite directions.

The contact holder body preferably comprises contact surfaces which are designed to interact with the mounting rail profile in such a way that the contact holder body is moved in the direction of the release position when the contacting element is inserted into the mounting rail profile, the release position preferably being reached only in a state in which the electrical module completely rests against the mounting rail. When the electrical module is connected to the mounting rail, the contact holder body is thus moved from the blocking position against the preferably present spring force in the direction of the release position by corresponding cooperation with the mounting rail profile, wherein this is in particular only reached when the module is in the suitable position.

It can preferably be provided that the contact holder body comprises blocking elements which, in the blocking position of the contact holder body, interact with the support element in such a way that a rotation of the contacting element is blocked. In contrast, when the contact retaining body is in the release position, these blocking elements then engage in recesses or undercuts of the support element in such a way that a rotation of the contacting element is then enabled. Ultimately, the additional safety according to the invention can thus be achieved when an electrical module is connected to a mounting rail by a special mounting and design of the contact holder body, which then interacts in a corresponding manner on the one hand with the mounting rail and on the other hand with the support element.

In addition, according to an advantageous development of the invention, it can be provided that the contact holder body has locking elements which interact with the mounting rail profile in such a way that the electrical module is mechanically secured to the mounting rail in the contacting position of the contacting element. These additional locking elements then ensure that in the position contacting the lines, the electrical module is also mechanically secured to the mounting rail.

Preferably, the main body has an actuating element or is coupled to a corresponding actuating element by means of which a simple rotation of the main body and thus of the contacting element is enabled, provided that the contact holder body is in the release position. In particular, the actuating element can have a grip part which projects laterally beyond the support element of the electrical module and can thus be actuated in a simple manner during the connection of the electrical module. In this case, the grip part can, for example, be connected or coupled to the main body via an elastic arm, wherein there is then the possibility of realizing an additional locking mechanism by means of which it is ensured that, in the state connected to the mounting rail, the contacting element can no longer easily be rotated and accordingly unintentionally released from the mounting rail.

Ultimately, the solution according to the invention thus ensures that, when an electrical module is connected to a mounting rail, only the lines of the busbar provided for this purpose can actually be contacted and thus an incorrect contacting, which can possibly lead to damage to the system or the module, is ruled out.

BRIEF DESCRIPTION OF THE DRAWINGS

The invention is explained in more detail in the following using the accompanying drawings. In the figures:

FIGS. 2*a*-2*d* show views of the electrical module in a state in which the contact holder body is in the blocking position:

FIGS. 3*a*-3*d* shows further views of the electrical module, the contact holder body now being in the release position and the contacting element assuming the contacting position:

DETAILED DESCRIPTION OF THE EMBODIMENT

Figure 5:
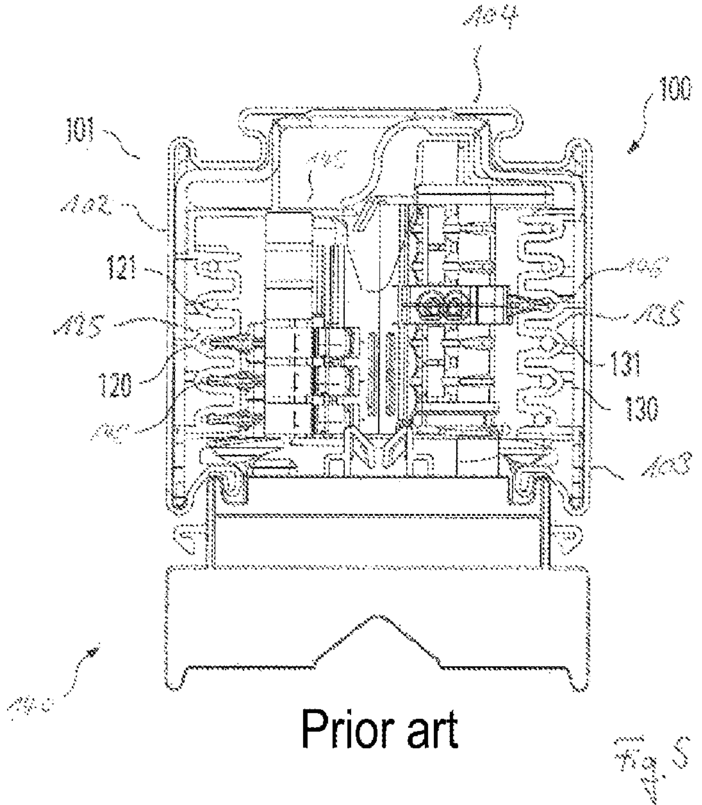
Prior art Fig. 5
FIGS. 5 and 6 show views of an electrical module having a contacting element according to the prior art.
Figure 6:
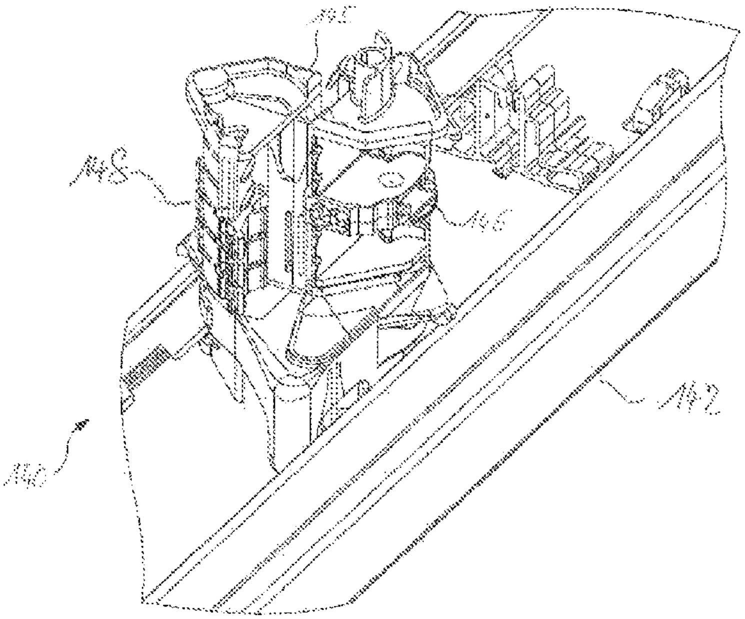
Prior art Fig. 6

As already mentioned, the present invention represents, for example, a development of the known "TECTON" system. Before the solution according to the invention is to be described in more detail, the basic design of such a mounting rail system will be explained below with reference to FIGS. 5 and 6. FIG. 5 shows a view of the mounting rail in which the busbars are arranged and are contacted by an electrical module—in this case by a luminaire. FIG. 6 in turn shows the design of a luminaire to be connected to this mounting rail system with a contacting element provided for this purpose.

It is here initially apparent that, an elongated support profile rail 101 that is U-shaped in cross-section and downwardly open for the known mounting rail system 100 is used which delimits an elongated receiving space with its two side walls 102 and 103 and the upper connecting wall 104, said receiving space being accessible from the underside via an elongated coupling opening. In the case shown, a so-called busbar 120 or 130 is then arranged, respectively, on the inner sides of each of the two side walls 102 and 103, which busbar in each case has a plurality of wires or conductors 121, 131 running in the longitudinal direction, said wires or conductors being arranged in longitudinal channels or grooves of a conductor receiving structure 125, 135 consisting of an insulating material. The channels thereby ensure a safe mounting of the conductors 121, 131 such that they cannot be touched inadvertently. At the same time, however, the channels are in each case designed to be open towards the interior of the support profile rail 101, so that a contacting of the conductors 121, 131 is enabled.

A luminaire 140 to be connected to this mounting rail system 100 then has at least one rotatably mounted contacting or tapping element 145, as can be seen in particular in FIG. 6 and which is arranged on an elongated support element 142 of the luminaire 140. To connect the luminaire 140, it is attached from the underside to the elongated support profile rail 101, wherein the contacting element 145 is thereby inserted into the support profile rail 101 via the elongated coupling opening and is then rotated by approximately 45°. Contacts 146 arranged on the contacting element 145 are thereby designed in such a way that they are pivoted out to the side by the rotation and thereby—as can be seen in particular in FIG. 5—engage in the receiving channels of the two busbars 120, 130, in order to contact the corresponding conductors 121, 131.

In the case shown, contacts 146 are arranged on both sides of the contacting element 145 to enable contacting of the busbars 120, 130 positioned on the two side walls 102, 103 of the mounting profile rail 101. By virtue of the contacts 146, together with an associated contact holder part and the cable (not visible) connected thereto, being displaceable vertically with respect to a contact holder body 148 of the tapping element 145, they can be arranged corresponding to the position of a desired conductor 121, 131, in order to then contact this corresponding conductor as desired. The possibility thereby exists, on the one hand, of a phase selection along with a selection of the neutral conductor for the power supply. Depending on the number of conductors made available by the busbars 120, 130, said conductors can then also be used for other purposes, such as for communication. The possibility thereby exists of combining the lighting units connected to the support profile rail 101 to form a larger light strip system, and of controlling the luminaires centrally from a central control unit.

Moreover, in addition to the lighting units shown in the figures, other electrical units may also be connected to the mounting rail system. In particular, sensors such as e.g. presence or brightness sensors that support an automated operation of the illumination system would hereby be conceivable. Units that enable a communication or transmission of data for other purposes, independently of the lighting controller, would also be conceivable as useful units to be connected to the mounting rail system. Finally, the most varied luminaire types are also conceivable that may be connected together to the support profile rail and thereby fulfill different tasks of the lighting technology.

In contrast to this heretofore known contacting element, an additional safety is provided with the aid of the present invention, which ensures that exclusively the desired lines of the busbar(s) can actually be contacted by the electrical module. The embodiment of the electrical module according to the invention, but in particular of the contacting element, is to be explained in more detail below with reference to FIGS. 1 to 4.

Figure 1:
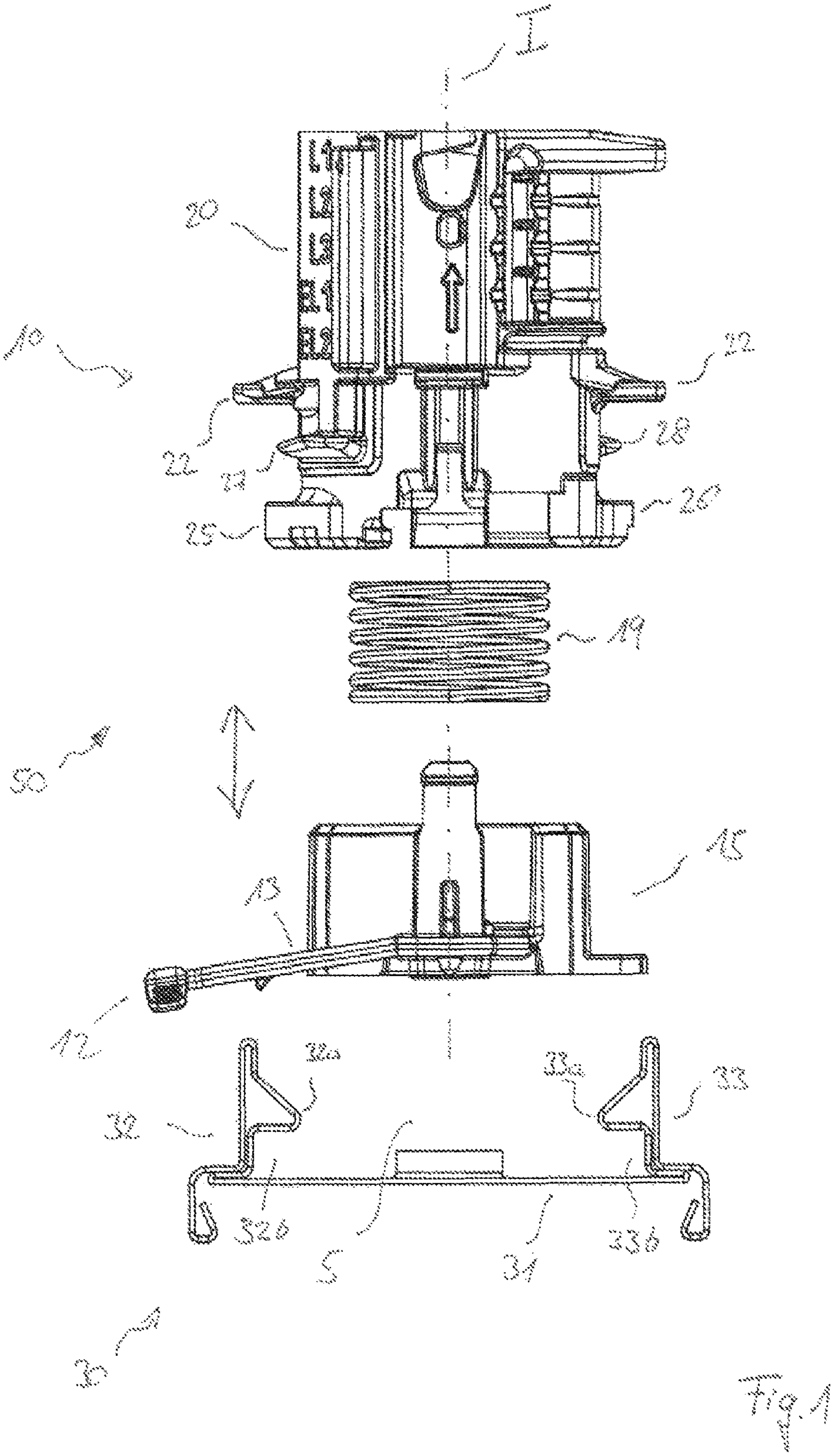
FIG. 1 shows an electrical module according to the invention with a corresponding contacting element in an exploded view.

FIG. 1 shows a sectional view of an electrical module 50 according to the invention which also has a support element 30 and a contacting element 10 like the luminaire explained with reference to FIGS. 5 and 6. The further components of the electrical module 30-which can include, for example, a luminaire to be connected to a mounting rail system—are not shown in the representations for reasons of clarity. Depending on the type of module 50, said module will comprise, for example, correspondingly suitable illuminants and associated components for operating the illuminants or, for example, a sensor and/or corresponding means for communication. As mentioned above, it can be a module which can be used in many ways within the scope of an elongated strip lighting system.

The support element 30 itself is designed in the form of an elongated profile part which is attached to the mounting rail profile and locked thereto in the manner shown in more detail below. In the case shown, the support element is a correspondingly reshaped elongated sheet metal part which then carries the further components of the module 50. It is also known from the prior art to use a circuit board that is used for the mounting of LEDs directly as a support element and then to deform it accordingly. This would obviously also be conceivable within the scope of the present invention.

It is essential that the support element 30 has a horizontal transverse web 31 corresponding to the representation, which is delimited on both longitudinal sides by corresponding lateral regions 32 and 33. These lateral regions 32, 33 form, together with the transverse web 31, a receiving region 5 which extends in the longitudinal direction of the support element 30 and serves in particular to accommodate at least the lower part of the contacting element 10. In particular, as explained in more detail below, this contacting element 10 is accommodated in the receiving region 5 in such a way that it can be rotated relative to a vertically extending axis I, namely between an open position on the one hand and a contacting position on the other hand.

According to the present invention, however, this rotation of the contacting element 10 can only be carried out under certain preconditions.

For this purpose, it is provided that the contacting element 10 is formed from substantially two components, on the one hand a main body 15 and on the other hand a contact holder body 20. Both components 15, 20 are coupled to one another in such a way that they can only be rotated together with respect to the axis I. In relation to this axis I, they thus have a fixed relation to one another.

In contrast to solutions known from the prior art, however, in the present case it is provided that a relative displacement can take place between the main body 15 and the contact holder body 20 along the axis of rotation I according to the representation by the double arrow. This opens up the possibility of moving the contact holder body 20 into different positions in the direction of the axis of rotation I, which then optionally enable or prevent a rotation of the contacting element 10 overall.

By means of a coil spring 19 arranged between the main body 15 and the contact holder body 20 and supported on both elements, it is initially ensured here that, in the unloaded state, the contact holder body 20 is pressed into a position remote from the main body 15, which position represents a so-called blocking position, in which the contacting element 10 cannot be rotated.

Figure 4:
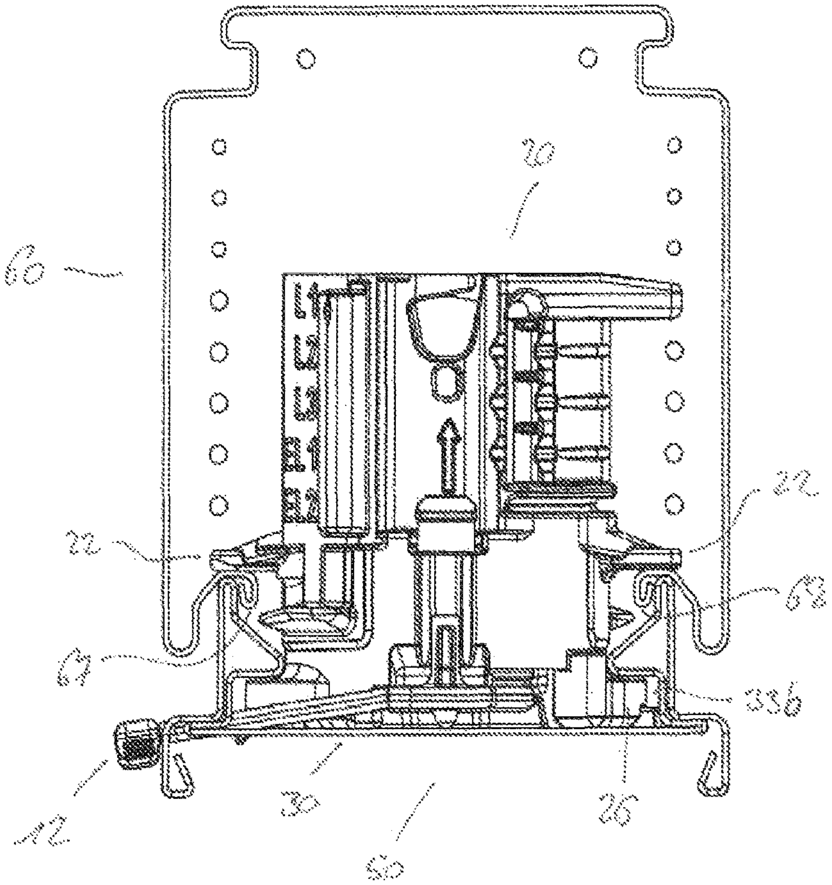
FIG. 4 shows a sectional view of an electrical module connected to a mounting rail, the contacting element being in the contacting position.

The concept according to the invention is clear from FIGS. 2 to 4, which are to be described in more detail below.

FIGS. 2*a* to 2*d* show the electrical module in different views, in particular the support element 30 with the contacting element 10 arranged thereon, wherein this is located in the open position and in particular is not inserted into a mounting rail. That is to say, in the case shown the contact holder body 20 is in the aforementioned blocking position.

In the open position of FIGS. 2*a*-2*d*, the contact holder body 20 is furthermore located in a rotary position in which wing-like locking elements 22, which project laterally from the contact holder body 20, for example, are aligned in such a way (see in particular the plan view in FIG. 2*c*) that, for example in contrast to the representation according to FIG. 1, they do not protrude laterally beyond the receiving region 5 of the support element 30, which is extended upwards. Contact elements, which are also provided on the contact holder body 20 and are not shown in the figures, are also pivoted inward based on the rotational position of the contacting element 10 in such a way that the contacting element 10 can be inserted into the elongated receiving space of a mounting rail profile from the underside, and in this case neither the contacts nor the locking elements 22 collide with the mounting rail profile. In this open position, the electrical module, as is also the case with the known contacting elements, can thus be attached to or removed from the mounting rail.

A special feature according to the invention is that, due to the effect of the spring 19, the contact holder body 20 also now is in an increased position relative to the main body 15 and thus also the support element 30, wherein this represents the blocking position already mentioned in which a rotation of the contacting element 10 is not possible. The blocking elements 25 and 26, which are provided in the lower region of the contact holder body, are formed by corresponding projections and are located in the locking position at the level of inwardly projecting projections 32*a* and 33*a* of the side wall regions 32 or 33 of the support element, are responsible for this. The distance between these two inwardly pointing projections 32*a* and 33*a* is dimensioned with respect to the dimensions of the blocking elements 25, 26 of the contact holder body 20 in such a way that they only fit between the two projections 32*a*, 33*a* when the contact holder body 20 or the contacting element 10 as a whole is in the rotated open position. However, pivoting out of this open position into a contacting position is not possible in this state, because the blocking elements 25, 26 already rest against the inner sides of the projections 32*a* and 33*a* and accordingly cannot be pivoted further out.

Only a downward pressing of the contact holder body 20 relative to the main body 15 results in the two blocking elements 25 and 26 moving further downwards in such a way that they are now located at the height of undercuts 32*b* and 33*b* of the side wall regions 32, 33 of the support element 30. These undercuts or recesses 32*b* and 33*b* then enable the contacting element 10 to rotate about the axis I, because now the blocking elements 25 and 26 can engage in these recesses 32*b*, 33*b*.

This can be seen in particular in the sectional view of FIG. 3*a*, in which the contact holder body 20 is in a lower position compared to the illustration according to FIG. 2*a*, and then in the pivoted state (the contacting element 10 is already in the contacting position in the illustrations, thus already in the contacting position), the blocking elements 25 and 26 engage into the previously mentioned undercuts 32*b*, 33*b* of the support element 30.

The contact holder body 20 should thus be pressed downward into the release position as automatically as possible when the electrical module 50 is attached to a mounting rail in such a way that the release position is reached at the moment in which the electrical module 50 was completely attached to the mounting rail. For this purpose, the contact holder body 20 designed according to the invention has additional lateral contact surfaces 27 and 28, which in turn project laterally opposite one another, but are offset with respect to the axis of rotation I compared to the locking wings 22 and the blocking elements 25 and 26. In particular, these contact surfaces 27 and 28 point outwardly when the contacting element 10 is in a rotary position which corresponds to the open position.

If in this state the electrical module 50 is attached to a U-shaped mounting rail from the underside, these contact surfaces 27 and 28 come into contact with inwardly projecting projections 67 and 68 (see FIG. 4) of the mounting rail profile 60. If the electrical module 10 is now pressed further against the mounting rail 60, this leads to the contact holder body 20 moving in the direction of the support element 30 counter to the spring force until it is in the lower release position in the state of the electrical module 50 where it is completely attached to the mounting rail 60. If the contacting element 10 is rotated from the open position into the contacting position in this state, the contacts arranged on the contact holder body 20 then pivot in the manner known to date in order to contact the lines of the busbar. At the same time, the locking elements 22 also pivot laterally, wherein these then overlap the upper sides of the corresponding projections 67 and 68 of the mounting rail profile, so that a mechanical locking of the electrical module on the trunking rail 60 is also achieved in addition to the electrical contacting.

The contacting element 10 can be pivoted by means of an actuating element 12, which is connected or correspondingly coupled to the main body 15 via a laterally projecting arm 13. This arm 13 passes through a corresponding opening in the side wall region 32 of the support element 30 and is preferably designed to be slightly flexible. By a corresponding design of the opening of the support element 30 in the form of an integrated ramp or the like, a locking mechanism can thereby be realized as an additional safety, by means of which locking mechanism it is ensured that the actuating arm, and thus also the contacting element 10 as a whole, remains in the locking position.

A connection of an electrical module provided according to the invention to a mounting rail is thus represented within the meaning of the solution according to the invention as follows:

a) In the initial state, the contacting element 10 is located opposite the support element 30 in the open position, in which both the locking elements 22 and the blocking elements 25 and 26 are pivoted inward based on the rotational position. In this unloaded state, due to the spring force, the contact holder body 20 is further pushed into the upper blocking position, in which the contacting element 10 cannot be rotated due to the above-described cooperation between the blocking elements 25 and 26 and the projections 32*a*, 33*a* of the side wall regions 32 and 33 of the support element 30.

b) If the electrical module is then attached to a mounting rail, the cooperation between the mounting rail profile and the contact surfaces 27 and 28 causes the contact holder body 20 to be pressed downward starting from the blocking position in the direction of the support element 30, wherein the lower release position is then reached when the electrical module has been completely attached to the mounting rail.

In this state, the blocking elements 25 and 26 are at the height of the recesses 32*b* and 33*b* of the side wall regions 32, 33 of the support element 30, so that the contacting element 10 can now be rotated, for example, 45 degrees with the aid of the actuating element 12 in order to reach the contacting position. In this contacting position, on the one hand, the lines of the busbar are contacted by the outwardly pivoted contacts of the contacting element 10, and on the other hand the now outwardly pivoted locking elements 22 overlap corresponding projections of the mounting rail profile, so that the electrical module is also mechanically secured to the mounting rail.

It can thus be seen that, based on the measures according to the invention, it is ensured that the contacts are only pivoted out in the correspondingly suitable position or arrangement of the electrical module relative to the mounting rail. Faulty contacting of incorrect lines is thereby ruled out.

The invention claimed is:

1. An electrical module (50) for connecting to a mounting rail which comprises a mounting rail profile (60) having two lateral walls and at least one busbar, which is arranged on one of the two inner sides of the lateral walls of the mounting rail profile and provides electrically contactable lines, the electrical module (50) comprising a contacting element (10), which can be inserted into the mounting rail profile (60) and comprises connection contacts, which are provided for bearing against lines of the busbar in a state in which the contacting element (10) is inserted into the mounting rail profile (60), the contacting element (10) being mounted so as to be rotatable about an axis of rotation (I) relative to a support element (30) of the electrical module (50) between an open position, in which an insertion and removal of the contacting element (10) from the mounting rail profile (60) is enabled, and a contacting position, in which the connection contacts contact lines of the busbar, and the contacting element (10) comprising a main body (15), which is rotatably accommodated in the support element (30) of the electrical module (50), and a contact holder body (20), which holds the connection contacts and is arranged on the main body (15) and rotates therewith, wherein the contact holder body (20) is mounted so as to be adjustable relative to the main body (15) along the axis of rotation (I) between a) a blocking position, in which a rotation of the contacting element (10) is blocked, and b) a release position, in which a rotation of the contacting element (10) is enabled;

the contact holder body (20) being resiliently preloaded into the blocking position.

2. The electrical module according to claim 1, wherein the contacting element comprises a spring (19), in particular a plate spring or a spiral spring, which acts between the main body (15) and the contact holder body (20).

3. The electrical module according to claim 1, wherein the contact holder body comprises contact surfaces (27, 28) which are designed to interact with the mounting rail profile (60) in such a way that the contact holder body (20) is moved in the direction of the release position when the contacting element (10) is inserted into the mounting rail profile (60), the release position only being reached in the state of the electrical module (50) applied to the mounting rail profile (60).

4. The electrical module according to claim 1, wherein the contact holder body (20) comprises blocking elements (25, 26) which, in the blocking position of the contact holder body (20), interact with the support element (30) in such a way that a rotation of the contacting element (10) is blocked.

5. The electrical module according to claim 4, wherein in the release position of the contact holder body (10), the blocking elements (25, 26) engage in recesses or undercuts (32*b*, 33*b*) of the support element (30) in such a way that the rotation of the contacting element (10) is enabled.

6. The electrical module according to claim 1, wherein the contact holder body (20) comprises latching elements (22) which interact with the mounting rail profile (60) in such a way that the electrical module (50) is secured on the mounting rail in the contacting position of the contacting element (10).

7. The electrical module according to claim 1, wherein the main body (15) comprises an actuating element (12) or is coupled to an actuating element (12).

8. The electrical module according to claim 7, wherein the actuating element (12) comprises a grip part which projects laterally beyond the support element (30).

9. The electrical module according to claim 8, wherein the grip part is connected or coupled to the main body (15) via an elastic or deflectable arm (13).

* * * * *